United States Patent
Cho

(10) Patent No.: US 8,914,031 B2
(45) Date of Patent: Dec. 16, 2014

(54) BEAMFORMING APPARATUS AND BEAMFORMING METHOD FOR ANTENNA

(75) Inventor: Jeong Hoon Cho, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 288 days.

(21) Appl. No.: 13/602,860

(22) Filed: Sep. 4, 2012

(65) Prior Publication Data

US 2013/0059620 A1    Mar. 7, 2013

(30) Foreign Application Priority Data

Sep. 2, 2011   (KR) .................. 10-2011-0089181

(51) Int. Cl.
 *H04W 36/00* (2009.01)
 *H04W 16/28* (2009.01)
 *H04W 88/02* (2009.01)

(52) U.S. Cl.
 CPC .............. *H04W 16/28* (2013.01); *H04W 88/02* (2013.01)
 USPC ........... 455/437; 455/524; 455/525; 343/714; 343/723

(58) Field of Classification Search
 CPC ............................ H04W 16/28; H04W 88/02
 USPC ........... 455/524, 525, 436, 437; 343/714, 723
 See application file for complete search history.

(56) References Cited

U.S. PATENT DOCUMENTS

| | | | |
|---|---|---|---|
| 6,768,913 B1* | 7/2004 | Molnar et al. | 455/562.1 |
| 7,995,468 B2* | 8/2011 | Sakai | 370/221 |
| 8,111,679 B2* | 2/2012 | Tsutsui | 370/342 |
| 8,374,650 B2* | 2/2013 | Kotecha et al. | 455/561 |
| 2006/0223573 A1* | 10/2006 | Jalali | 455/552.1 |
| 2007/0135125 A1* | 6/2007 | Kim et al. | 455/436 |
| 2008/0051150 A1* | 2/2008 | Tsutsui | 455/562.1 |
| 2008/0181174 A1* | 7/2008 | Cho | 370/329 |
| 2009/0092122 A1* | 4/2009 | Czaja et al. | 370/350 |
| 2010/0054121 A1* | 3/2010 | Sakai | 370/221 |

FOREIGN PATENT DOCUMENTS

| | | |
|---|---|---|
| JP | 2005-128671 A | 5/2005 |
| JP | 2006-246338 A | 9/2006 |
| JP | 2009-164920 A | 7/2009 |

* cited by examiner

*Primary Examiner* — Dominic E Rego

(74) *Attorney, Agent, or Firm* — Birch, Stewart, Kolasch & Birch, LLP

(57) ABSTRACT

Disclosed are a beamforming method and a beamforming apparatus for an adaptive antenna. A mobile terminal equipped with the adaptive antenna is initialized, a base station to transceive a signal with the mobile terminal is searched, beamforming is performed based on the searched base station, a reference position value of the mobile terminal is stored, and the beamforming of the antenna is adjusted if a sensing module in the mobile terminal detects position change of the mobile terminal based on a reference position. A changed position of the mobile terminal is stored as the reference position value, so that the position of the terminal is detected based on the reference position in real time, thereby simply and accurately performing the beamforming.

16 Claims, 4 Drawing Sheets

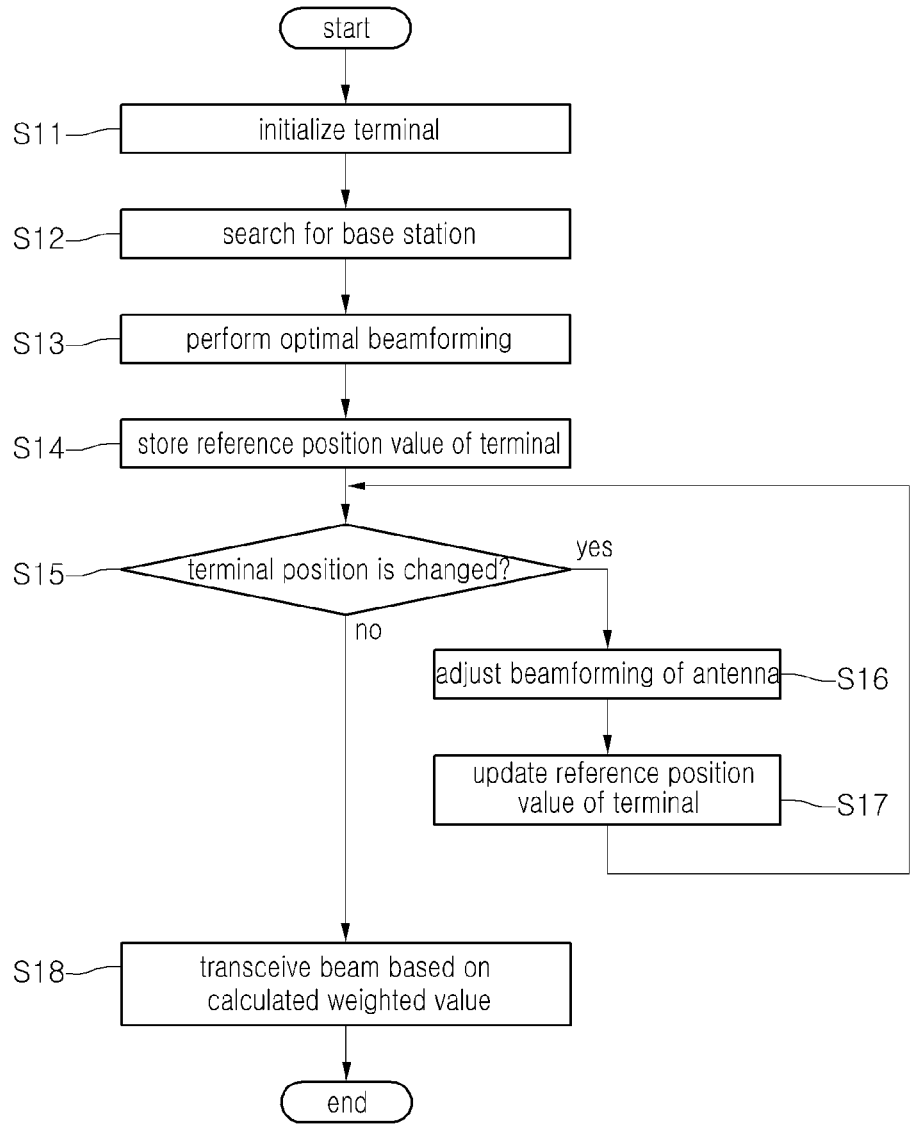

BEAMFORMING APPARATUS AND BEAMFORMING METHOD FOR ANTENNA

BACKGROUND

The disclosure relates to a beamforming apparatus and a beamforming method for an antenna. In particular, the disclosure relates to a beamforming apparatus and a beamforming method for an antenna, capable of checking a direction toward a base station in real time by using an inertial sensor of an appliance equipped with an antenna, and optimally correcting beamforming when the position of the base station is changed.

Recently, as communication systems are developed to 3G and 4G communication systems, the development of the optimal antenna has been accelerated according to the diversified channel environments. In addition, a multi-input multi-output (MIMO) scheme for high-rate data transmission and an adaptive MIMO beamforming scheme according to the energy efficiency and a propagation environment have been employed. An adaptive antenna array may be used for a signal received therein from a desirable signal source or a signal received therein from an undesirable or interfered signal source, and beamforming may be performed by setting a weighted value with respect to an individual antenna installed in each antenna array.

Meanwhile, when performing the optimal beamforming by calculating an AOA (angle of arrival), a phase, and an intensity of a signal received from a base station in real time in order to improve the efficiency of the adaptive antenna, a communication load between base stations is caused, a predetermined computation time is required, or a complex algorithm for the computation is required. Accordingly, a beamforming technology to minimize the network load caused by the position change of the terminal is required.

SUMMARY

The disclosure provides a beamforming apparatus and a beamforming for an antenna, capable of reducing a computation time when performing real-time beamforming by mounting an acceleration sensor in a terminal and by performing the beamforming according to the position change of the terminal.

According to the embodiment, there is provided a beamforming method for an adaptive antenna, which includes initializing a mobile terminal equipped with the adaptive antenna, searching for a base station to transceive a signal with the mobile terminal, performing beamforming based on the searched base station, storing a reference position value of the mobile terminal, and adjusting the beamforming of the antenna if a sensing module in the mobile terminal detects position change of the mobile terminal based on a reference position.

According to the embodiment, there is provided a beamforming apparatus for an adaptive antenna. The beamforming antenna includes a controller of initializing a mobile terminal equipped with the adaptive antenna, a wireless communication module of searching for a base station to transceive a signal with the mobile terminal, and a sensing module of detecting position change of the mobile terminal. The wireless communication module performs beamforming suitable for the transceiving of the signal and adjusts the beamforming of the antenna according to the position change of the mobile terminal.

According to the disclosure, the beamforming of an antenna can be effectively performed through simple computation and communication.

BRIEF DESCRIPTION OF THE DRAWINGS

FIG. 4 is a flowchart showing the beamforming method according to one embodiment of the disclosure.

DETAILED DESCRIPTION OF THE EMBODIMENTS

Figure 1:
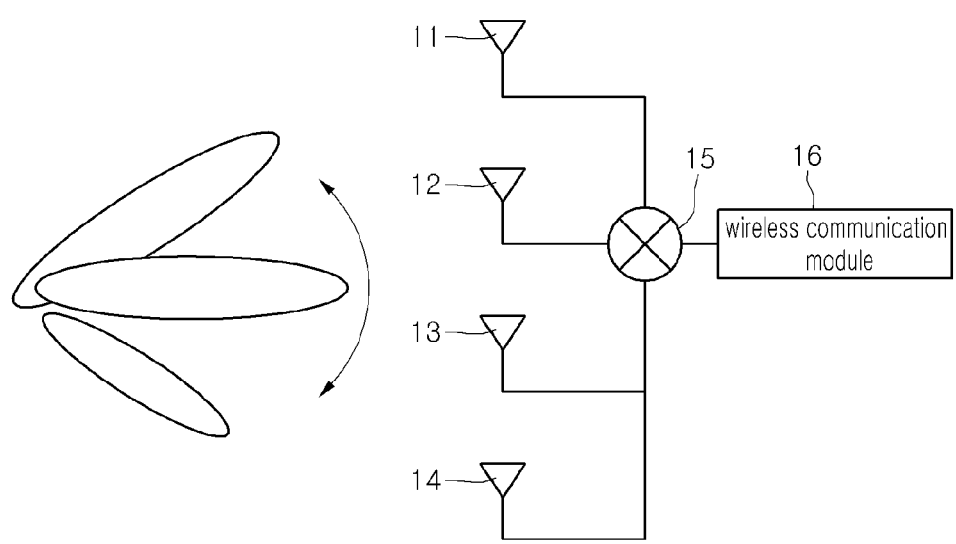
FIG. 1 is a block diagram showing a beamforming method for an adaptive antenna.

FIG. 1 is a block diagram showing a beamforming method for an adaptive antenna. Referring to FIG. 1, the adaptive antenna may include an antenna array including a plurality of antennas 11, 12, 13, and 14, a circuit 15 to combine signals received therein from the antenna, and a wireless communication module 16. The wireless communication module 16 may include a frequency down converter (not shown) to convert a high frequency signal received therein from the antenna array into a baseband signal, an A/D converter to convert an analog signal to a digital signal, and a beam former which measures the intensities, phases, and angles of arrival of signals arrived therein through various paths to perform a time-space process for the purpose of beamforming and to apply a weighted value to each antenna through a beamforming algorithm. Meanwhile, the weighted value applied to the beam former may be provided in the form of a vector having a dimension corresponding to the number of antennas constituting each antenna array. To this end, various beamforming algorithms may be used. The disclosure provides a beamforming method and a beamforming apparatus, capable of detecting the position change of an antenna and correcting beamforming based on the detected position change of the antenna. The beamforming apparatus according to one embodiment of the disclosure may be applied to a mobile terminal equipped with an adaptive antenna, a smart phone, a cellular phone, and a satellite phone.

Figure 2:
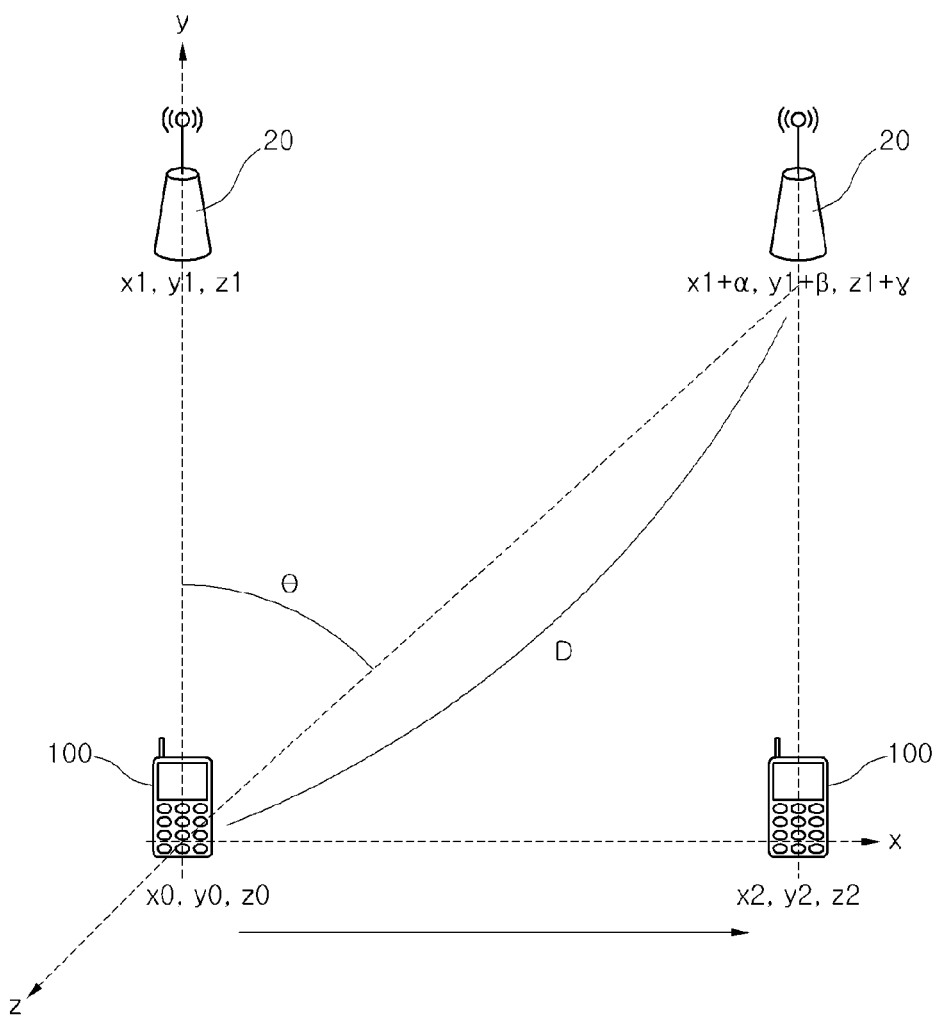
FIG. 2 is a view showing a beamforming angle according to the position change of a terminal.

FIG. 2 is a view showing the calculation of a beamforming angle according to the position change of a terminal. Hereinafter, a case in which the beamforming apparatus according to one embodiment of the disclosure is applied to a mobile terminal 100 equipped with an adaptive antenna will be described with reference to FIG. 2.

The mobile terminal 100 searches for the position of a base station 20 by using an antenna installed in the mobile terminal 100. The mobile terminal 100 may first initialize each module of the mobile terminal 100 after the power of the mobile terminal 100 has been turned on. The mobile terminal 100 initializes the modules by applying power to the antenna and a sensing module and checking the states of the modules.

Next, the mobile terminal 100 searches for the base station 20 at a reference position (x0, y0, z0). When detecting the base station 20 in the state that appliance initialization is performed, the position of the base station 20 about the mobile terminal 100 may be detected at an initial position (x1, y1, z1). The mobile terminal 100 performs the beamforming, which is optimized to transceive signals with the base station 20, on the basis of the base station 20 positioned at the initial position (x1, y1, z1). The beamforming may be performed by calculating a weighted value vector of each antenna based on the direction of the base station 20 as described above.

The mobile terminal 100 stores the reference position (x0, y0, z0) at which the beamforming is optimized.

Meanwhile, when the mobile terminal 100 relatively moves with respect to the base station 20, that is, the relative position between the mobile terminal 100 and the base station 20 is changed, the position of the base station 20 may be detected based on the mobile terminal 100. For example, when the initial position (x1, y1, z1) of the base station 20 is shifted to the position (x1+α, y1+β, z1+γ), the mobile terminal 100 must adjust the existing beamforming in relation to the base station 20. The changed position (x1+α, y1+β, z1+γ) of the base station 20 may be detected by using a gyro sensor installed in the mobile terminal 100. The position of the base station 20 may be set based on the relative position shift of the mobile terminal 100, and may be defined on a sphere about the mobile terminal 100. FIG. 2 shows the position of the base station 20 on the spherical surface having a radius of D. The initial position (x0, y0, z0) of the mobile terminal 100 corresponds to the initial position (x1, y1, z1) of the base station 20. In addition, the relative position (x2, y2, z2) of the mobile terminal may be expressed as the position (x1+α, y1+β, z1+γ) of the base station 200. When the position of the base station 20 is changed, the direction of the base station 20 may be calculated as a direction inclined at an angle of θ from the initial position (x1, y1, z1). The angle θ for the direction of the base station 20 may be defined as following Equation 1.

In this case, the radius D of the sphere is 1, and α, β, and γ serving as output values of the gyro sensor are in the range of −1 and 1.

$$\theta = \cos^{-1} \frac{2D^2 - (\alpha^2 + \beta^2 + \gamma^2)}{2D^2} \quad \text{Equation 1}$$

The mobile terminal 100 may periodically repeat a series of processes of updating the reference position of the mobile terminal 100 to the position (x2, y2, z2), searching for the position of the base station 20 by using the updated reference position (x2, y2, z2), and modifying the beamforming and updating the reference position of the mobile terminal 100 if the position of the base station 20 is changed, that is, if the position of the mobile terminal 100 is changed. Accordingly, the computation amount and the computation time for the beamforming can be more reduced as compared with the conventional beamforming scheme based on the signal transceiving between the mobile terminal 100 and the base station 20.

Figure 3:
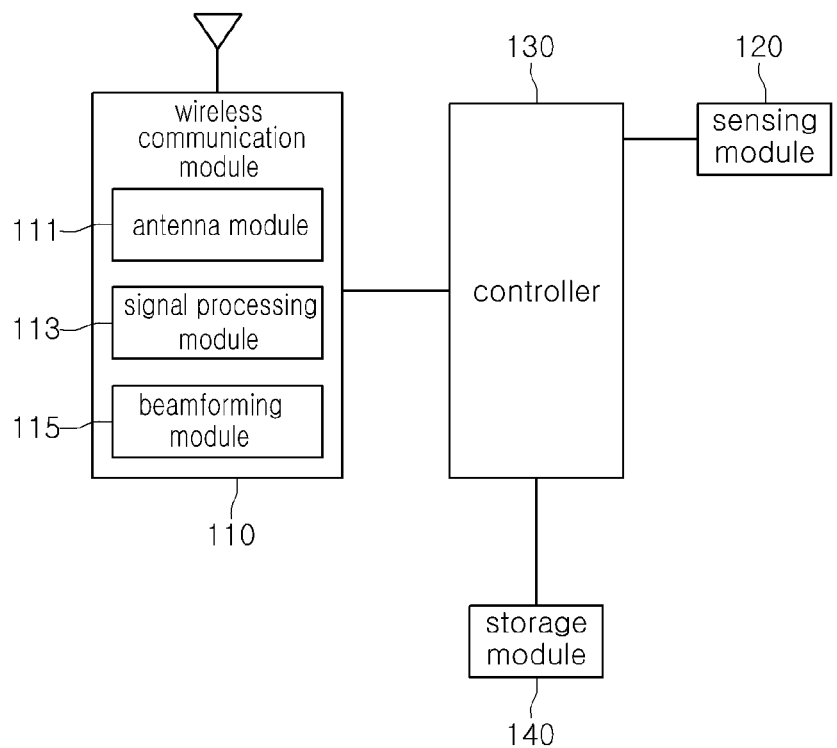
FIG. 3 is a block diagram showing the structure of a beamforming apparatus according to one embodiment of the disclosure.

FIG. 3 is a block diagram showing the structure of a beamforming apparatus according to one embodiment of the disclosure. Referring to FIG. 3, the beamforming apparatus according to one embodiment of the disclosure may be realized as the mobile terminal 100. The mobile terminal 100 may include a wireless communication module 110 to transceive signals with the base station 20, a sensing module 120 to periodically detect the position change of the mobile terminal 100, a controller 130 to initialize the mobile terminal 100 and calculate a beamforming angle based on the reference position of the mobile terminal 100, and a storage module 140 to store the reference position of the mobile terminal 100 and the changed position of the mobile terminal 100.

The wireless communication module 110 may include an antenna module 111 used to transceive signals with the base station 20, a signal processing module 113 including a converter frequency transforming converter to convert signals transceived from the antenna through analog-to-digital converting or digital-to-analog converting, and a beamforming module 115 to calculate a weighted value vector of each antenna of an adaptive antenna.

The sensing module 120 may include a gyro sensor to detect the position change of the mobile terminal 100.

The controller 130 can perform a series of operations to initialize the mobile terminal 100, detect the changed position of the mobile terminal 100 in real time, and calculate the weighted value of an antenna array by using the changed position of the mobile terminal 100 as a reference position.

The storage module 140 may store a reference position value of the mobile terminal 100, a weighted value vector of each antenna included in the antenna array, and data required for the beamforming algorithm used to calculate the weighted value vector. In addition, if the position of the mobile terminal 100 is changed, the storage module 140 may store the changed position of the mobile terminal 100 as an updated position.

FIG. 4 is a flowchart showing a beamforming method according to one embodiment of the disclosure.

In step S11, the mobile terminal 100 is initialized.

In step S12, the wireless communication module searches for the base station 20.

In step S13, if the base station 20 has been searched, the mobile terminal performs beamforming so that the signal transceiving is optimized with respect to the related base station.

In step S14, the reference position value of the mobile terminal 100 is stored in the state that the optimal beamforming is performed.

In step S15, a check is made regarding if the position of the mobile terminal is changed. The check regarding if the position of the mobile terminal is changed may be made at a predetermined period, for example, 1 second. If the position of the terminal is not changed, the position change of the mobile terminal is checked when the next period comes, so that the beamforming between the mobile terminal and the base station can be maintained in real time.

In step S16, the antenna beamforming is adjusted based on the changed position value of the mobile terminal. The beamforming of the antenna may include calculating a weighted value vector of each antenna to constantly maintain beamforming between base stations based on the changed position of the mobile terminal.

In step S17, the changed position of the terminal is stored as the reference position value. In other words, the reference position value of the mobile terminal is changed.

Even after the changed position of the terminal is stored as the reference position value in step S17, the position change of the mobile terminal is checked in real time (step S15). If the position is changed, operations of changing the beamforming (step S16) and updating the reference position value (step S17) may be repeated. In other words, operations in steps S15 to S17 of frequently checking the position change of the mobile terminal, adjusting the beamforming of the antenna, and updating the changed position as the reference position value may be repeatedly performed.

In step S18, if a determination is made in step S15 that the position of the terminal is not changed, a beam pattern is formed based on a previously calculated weighted value, and the beam is transmitted to the base station. In other words, if the position of the terminal is not changed, the beamforming method according to one embodiment of the disclosure is ended.

As described above, the beamforming method, which can be performed in the mobile terminal, and the beamforming apparatus have been described. The disclosure is not limited to the above embodiment, but applicable to a device provided thereon with a sensor, which can detect the position thereof, and an antenna.

As described above, according to one embodiment of the disclosure, the beamforming of the antenna can be effectively performed by using the simple computation and the simple communication.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A beamforming method for an adaptive antenna, the beamforming method comprising:
   initializing a mobile terminal equipped with the adaptive antenna;
   searching for a base station to transceive a signal with the mobile terminal;
   performing beamforming based on the searched base station;
   storing a reference position value of the mobile terminal; and
   adjusting the beamforming of the antenna if a sensing module in the mobile terminal detects position change of the mobile terminal based on a reference position.

2. The beamforming method of claim 1, further comprising storing a changed position of the mobile terminal as the reference position value.

3. The beamforming method of claim 1, wherein the position change is detected by gyroa gyro sensor mounted on the mobile terminal at a predetermined period.

4. The beamforming method of claim 3, further comprising calculating a beamforming angle of the adaptive antenna by using a detected position change value.

5. The beamforming method of claim 4, wherein, in the adjusting of the beamforming of the antenna if the sensing module in the mobile terminal detects the position change of the mobile terminal based on the reference position, movement of the mobile terminal is determined as relative movement of the base station.

6. The beamforming method of claim 5, wherein the base station is positioned on a sphere about the mobile terminal.

7. The beamforming method of claim 6, wherein the beamforming angle satisfies an equation, $$\theta = \cos^{-1} \frac{2D^2 - (\alpha^2 + \beta^2 + \gamma^2)}{2D^2},$$

in which D refers to a radius of the sphere and $\alpha$, $\beta$, and $\gamma$ refer to output values of the gyrogyro sensor.

8. The beamforming method of claim 7, wherein the $\alpha$, $\beta$, and $\gamma$ have values in a range of −1 to 1.

9. A beamforming apparatus for an adaptive antenna, the beamforming antenna comprising:
   a controller of initializing a mobile terminal equipped with the adaptive antenna;
   a wireless communication module of searching for a base station to transceive a signal with the mobile terminal; and
   a sensing module of detecting position change of the mobile terminal,
   wherein the wireless communication module performs beamforming suitable for the transceiving of the signal and adjusts the beamforming of the antenna according to the position change of the mobile terminal.

10. The beamforming apparatus of claim 9, wherein the controller stores a changed position of the mobile terminal as a reference position value.

11. The beamforming apparatus of claim 10, wherein the sensing modules detects the position change of the mobile terminal at a predetermined period.

12. The beamforming apparatus of claim 11, wherein the controller calculates a beamforming angle of the adaptive antenna by using a detected position change value.

13. The beamforming apparatus of claim 12, wherein the controller determines movement of the mobile terminal as relative movement of the base station.

14. The beamforming apparatus of claim 13, wherein the controller determines that the base station is positioned on a sphere about the mobile terminal.

15. The beamforming apparatus of claim 14, wherein the beamforming angle satisfies an equation, $$\theta = \cos^{-1} \frac{2D^2 - (\alpha^2 + \beta^2 + \gamma^2)}{2D^2},$$

in which D refers to a radius of the sphere and $\alpha$, $\beta$, and $\gamma$ refer to output values of the gyrogyro sensor.

16. The beamforming apparatus of claim 15, wherein the $\alpha$, $\beta$, and $\gamma$ have values in a range of −1 to 1.

* * * * *